(12) United States Patent
Matsumoto et al.

(10) Patent No.: US 6,597,968 B2
(45) Date of Patent: Jul. 22, 2003

(54) NUMERICAL CONTROL APPARATUS AND CONTROL METHOD OF MACHINE TOOL

(75) Inventors: Ichiro Matsumoto, Numazu (JP); Jun Fujita, Mishima (JP)

(73) Assignee: Toshiba Kikai Kabushiki Kaisha, Tokyo (JP)

(*) Notice: Subject to any disclaimer, the term of this patent is extended or adjusted under 35 U.S.C. 154(b) by 178 days.

(21) Appl. No.: 09/775,833

(22) Filed: Feb. 5, 2001

(65) Prior Publication Data

US 2001/0012972 A1 Aug. 9, 2001

(30) Foreign Application Priority Data

Feb. 3, 2000 (JP) ........................................ 2000-032675

(51) Int. Cl.[7] ............................................. G06F 19/00
(52) U.S. Cl. ...................... 700/188; 700/186; 700/189; 700/170
(58) Field of Search ................................ 700/173, 177, 700/181, 183, 186–190, 194, 188

(56) References Cited

U.S. PATENT DOCUMENTS

| | | | | |
|---|---|---|---|---|
| 5,200,680 A | * | 4/1993 | Sasaki et al. | 318/560 |
| 5,508,596 A | * | 4/1996 | Olsen | 318/569 |
| 5,544,046 A | * | 8/1996 | Niwa | 700/159 |
| 6,401,004 B1 | * | 6/2002 | Yamazaki et al. | 318/568.1 |
| 6,438,446 B1 | * | 8/2002 | Trachier | 408/11 |
| 6,445,973 B1 | * | 9/2002 | Sagasaki et al. | 700/169 |

* cited by examiner

*Primary Examiner*—Leo Picard
*Assistant Examiner*—Michael D. Masinick
(74) *Attorney, Agent, or Firm*—Pillsbury Winthrop LLP

(57) ABSTRACT

A numerical control apparatus of a machine tool capable of shortening a machining time while maintaining a machining precision of a workpiece, provided with an analyzer for analyzing a machining program defining machining process of a workpiece by the machine tool to extract information for specifying a feed speed of a cutting tool to the workpiece and cutting/non-cutting information for defining actual cutting by the cutting tool added to a cutting feed command program from the cutting feed command program contained in this machining program, a feed speed optimizer for calculating a permissible feed speed of the cutting tool in accordance with content of the cutting/non-cutting information based on the extracted information and optimizing the feed speed of the cutting tool so as to be within the permissible feed speed, and a distribution unit for calculating control commands to be distributed to the control axes of the machine tool based on the optimized feed speed.

7 Claims, 10 Drawing Sheets

| | | | |
|---|---|---|---|
| N00 | G00 | X0. | ···(1) |
| N01 | G01 | X90. Q0 F10000 | ···(2) |
| N02 | G02 | X100. Y10. R10. Q1 | ···(3) |
| N03 | G02 | X90. Y20. R10. Q0 | ···(4) |

NUMERICAL CONTROL APPARATUS AND CONTROL METHOD OF MACHINE TOOL

BACKGROUND OF THE INVENTION

1. Field of the Invention

The present invention relates to a numerical control apparatus of a machine tool, for example, a machining center and a control method of the machine tool.

2. Description of the Related Art

In a machining program prepared for machining a workpiece used in a numerical control apparatus (NC apparatus) of for example a machining center or other machine tool, commands for defining linear movement of a cutting tool to the workpiece include a rapid feed command and a cutting feed command.

A rapid feed command is normally a command for positioning the workpiece and the cutting tool when not cutting the workpiece by the cutting tool. Accordingly, it is not necessary to consider the effect of vibration occurring due to the movement and the path precision of a machining point of the cutting tool exerted upon the machined surface of the workpiece. When using a rapid feed command, it is possible to move the cutting tool at a high feed speed and a high acceleration.

On the other hand, a cutting feed command is a command used predicated on actual machining of the workpiece by the cutting tool. Accordingly, it is necessary to consider the effect of the vibration occurring due to the linear movement and the path precision of the machining point of the cutting tool exerted upon the machined surface of the work. For this reason, in an NC apparatus, the feed speed of the tool when using a cutting feed command is restricted in comparison with a rapid feed command from the viewpoint of maintaining the machining precision etc.

In machining centers and other machine tools, there is a strong demand for shortening the machining time by realizing high speed machining of a workpiece.

For example, a free curved surface of a die or the like is cut by reciprocal movement of an end mill T as shown in FIG. 1. Specifically, the end mill T is moved linear in the X-direction by the cutting feed command and stopped when it reaches a target position. Then, a pick feed is performed to move the end mill T linear in the Y-axis direction at a feed pitch P by a rapid feed command. Further, the end mill T is moved in a reverse direction in the X-axis direction by a cutting feed command.

However, when cutting a free curved surface by the process as described above, it is necessary to repeatedly stop the end mill T for the pick feed. For this reason, there were the disadvantages of abrupt acceleration and deceleration for the positioning of the end mill T, a susceptibility to shock, a long time required for the pick feed, and as a result a long machining time.

As a method for solving this, it has been proposed not to perform the pick feed of the end mill T by linear movement, but to make the path of movement of the end mill T curved or arc like such as the path shown by the broken line in FIG. 1. By making the path of movement of the end mill T an arc or other curve, it is possible to continuously and smoothly shift from cutting feed in the X-axis direction to pick feed and from pick feed to cutting feed in the X-axis direction in a reverse orientation to the former, so the shock can be eased.

In a conventional NC apparatus, in order to perform this pick feed by an arc or other curved path of movement, it is necessary to use an arc cutting feed command. The only arc or curve feed command standardized as a preparation function (G function) of a numerically controlled machine tool in Japanese Industrial Standards (JIS) B6314 is an arc cutting command. For this reason, as described above, there was the disadvantage that the feed speed in the pick feed was restricted, so it was difficult to shorten the machining time.

On the other hand, recently, machining programs for cutting as described above are being automatically programmed by computer aided design (CAD) systems and computer aided machining (CAM) systems. If such machining programs are executed by machining centers having different machining performances, the precision of the machined surface of the workpiece becomes different according to the machining performance. In order to keep the precision of the machined surface constant even if the machining performances of the machining centers used are different, it is necessary to correct and adjust the feed speed in the machining program at the NC apparatus side of each machining center, so there is the disadvantage that a great amount of trouble is involved.

SUMMARY OF THE INVENTION

An object of the present invention is to provide a numerical control apparatus of a machine tool capable of shortening the machining time while maintaining the machining precision of the work.

Another object of the present invention is to provide a numerical control apparatus of a machine tool capable of maintaining the machining precision of a workpiece even if a workpiece is machined by machine tools having different performances using the same machining program.

Still another object of the present invention is to provide a control method of a machine tool using the numerical control apparatus.

According to a first aspect of the present invention, there is provided a numerical control apparatus of a machine tool comprising an analyzing means for analyzing a machining program defining machining process of a workpiece by the machine tool to extract from, a cutting feed command program included in the machining program, information for specifying a feed speed of a cutting tool to the workpiece and cutting/non-cutting information defining actual cutting by the cutting tool added to the cutting feed command program, a feed speed optimizing means for calculating a permissible feed speed of the cutting tool in accordance with the content of the cutting/non-cutting information based on the extracted information and optimizing the feed speed of the cutting tool to be within the permissible feed speed, and a distributing means for calculating control commands to be distributed to the control axes of the machine tool based on the optimized feed speed.

According to a second aspect of the present invention, there is provided a numerical control apparatus of a machine tool comprising an analyzing means for analyzing a machining program defining machining process of a workpiece by the machine tool to extract from, a cutting feed command program included in the machining program, information for specifying a feed speed of a cutting tool to the workpiece and permissible error defining a permissible range of error from the path of movement of the cutting tool added to the cutting feed command program, a feed speed optimizing means for calculating a permissible feed speed of the cutting tool in accordance with the permissible error based on the extracted information and optimizing the feed speed of the cutting tool to be within the permissible feed speed, and a distributing means for calculating control commands to be distributed to the control axes of the machine tool based on the optimized feed speed.

According to a third aspect of the present invention, there is provided a numerical control apparatus of a machine tool comprising an analyzing means for analyzing a machining program defining machining process of a workpiece by the machine tool to extract from, a cutting feed command program included in the machining program, information for specifying a feed speed of a cutting tool to the workpiece and machining information added to the cutting feed command program, a feed speed optimizing means for optimizing a feed speed of the cutting tool based on the extracted information, and a distributing means for calculating control commands to be distributed to the control axes of the machine tool based on the optimized feed speed.

According to a fourth aspect of the present invention, there is provided a control method of a machine tool comprising steps of preparing a machining program defining machining process of a workpiece by the machine tool provided with a cutting tool able to move in the directions of a plurality of control axes by a driving means, adding cutting/non-cutting information defining actual cutting by the cutting tool to a cutting feed command program included in the machining program, downloading the machining program added with the cutting/non-cutting information to a numerical control apparatus and executing the machining program, extracting at the numerical control apparatus, from the cutting feed command program, information for specifying a feed speed of the cutting tool to a workpiece and cutting/non-cutting information, calculating the permissible feed speed of the cutting tool in accordance with the content of the cutting/non-cutting information based on the information for specifying the feed speed of the cutting tool and optimizing the feed speed of the cutting tool to be within the permissible feed speed, and calculating control commands to be distributed to the control axes of the machine tool based on the optimized feed speed and controlling the control axes.

According to a fifth aspect of the present invention, there is provided a control method of a machine tool provided with a numerical control apparatus for driving a machine tool to execute cutting of a workpiece in accordance with a machining program, comprising steps of preparing a machining program defining machining process of a workpiece by the machine tool, adding information of a permissible error defining a permissible range of error from a path of movement of a cutting tool to a cutting feed command program included in the machining program, downloading the machining program added with the information of the permissible error to a numerical control apparatus and executing the machining program, extracting at the numerical control apparatus, from the cutting feed command program, information for specifying a feed speed of the cutting tool to the workpiece and the information of the permissible error, calculating the permissible feed speed of the cutting tool in accordance with the permissible error based on the extracted information and optimizing the feed speed of the cutting tool to be within the permissible feed speed, and calculating control commands to be distributed to the control axes of the machine tool based on the optimized feed speed and controlling the control axes.

According to a sixth aspect of the present invention, there is provided a control method of a machine tool provided with a numerical control apparatus for driving a machine tool to execute cutting of a workpiece in accordance with a machining program, comprising steps of preparing a machining program defining a machining process of a workpiece by the machine tool, adding predetermined machining information to a cutting feed command program included in the machining program, downloading the machining program added with the machining information to a numerical control apparatus and executing the machining program, extracting at the numerical control apparatus, from the cutting feed command program, information for specifying a feed speed of the cutting tool to a workpiece and the machining information, optimizing the feed speed of the cutting tool based on the extracted information, and calculating control commands to be distributed to the control axes of the machine tool based on the optimized feed speed and controlling the control axes.

In the present invention, when preparing a machining program, machining information is newly added to the cutting feed command program contained in the machining program.

When the machining program with this machining information added is executed, information specifying the feed speed of the cutting tool to the workpiece is extracted from the cutting feed command program contained in the machining program and the machining information added to the cutting feed command program is extracted.

Based on the extracted information, the feed speed of the cutting tool is optimized. Namely, the feed speed is determined based on the machining information added to the cutting feed command program.

For example, by adding cutting/non-cutting information defining actual cutting by the cutting tool as the machining information, the feed speed is restricted when actually cutting so as to maintain the precision of the machined surface. When not cutting, the feed speed is set at a speed as high as possible in order to realize high speed machining.

Further, by adding information of a permissible error from the path of movement of the cutting tool to the cutting feed command program, the feed speed is optimized so as to achieve the machining precision defined by the permissible error.

That is, the feed speed is optimized in accordance with the performance of the machine tool, for example, a position loop gain of a servo controlling means. Therefore, even if the same machining program is executed in machine tools having different performances, the machining precision is maintained within a range of the permissible error.

BRIEF DESCRIPTION OF THE DRAWINGS

These and other objects and features of the present invention will be more apparent from the following description given in relation to the accompanying drawings, wherein:

FIG. 10 is a view of an example of a machining program PR2 downloaded to an analyzer.

DESCRIPTION OF THE PREFERRED EMBODIMENTS

Figure 1:
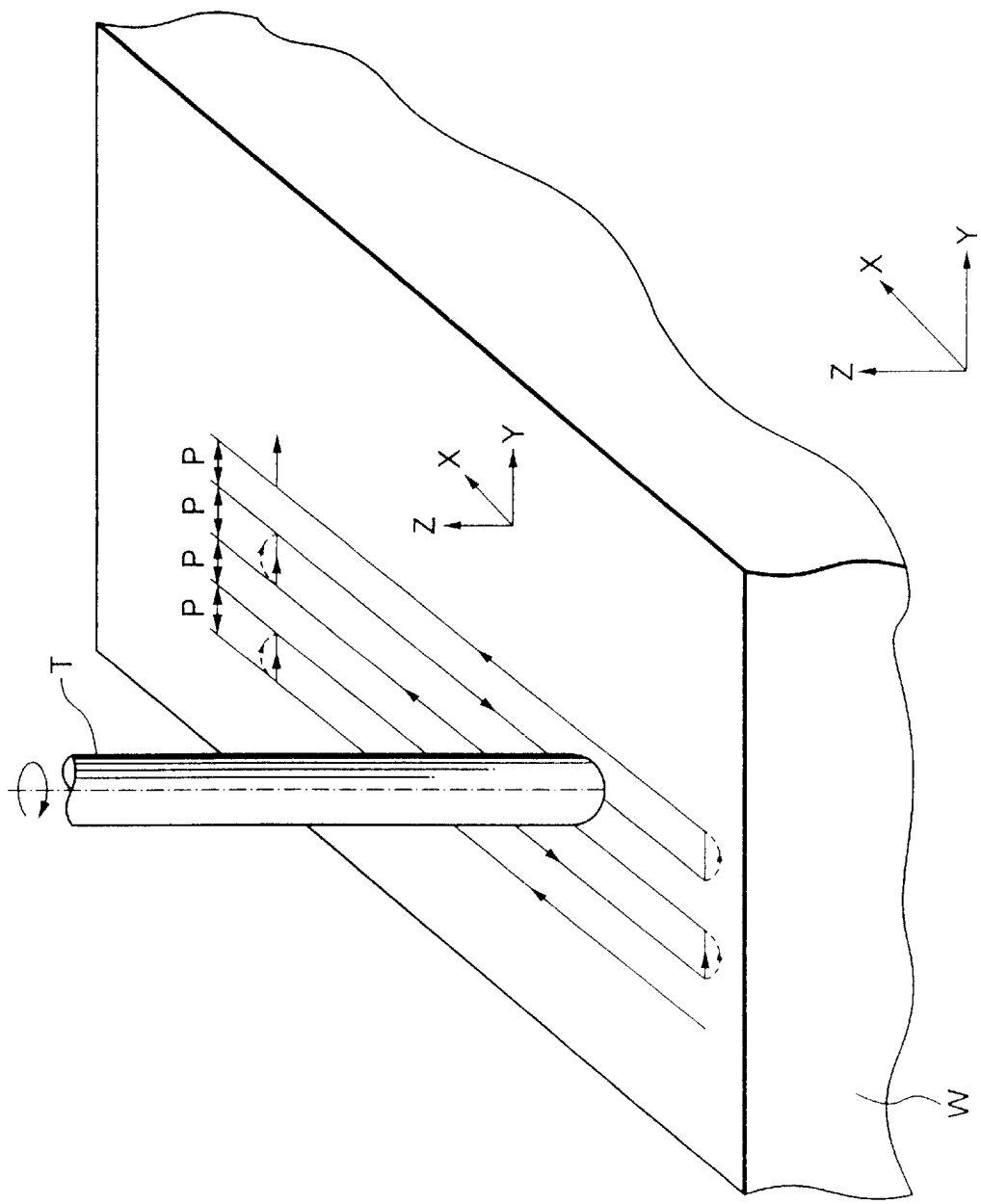
FIG. 1 is a perspective view for explaining an example of pick feed of a cutting tool.

Below, an explanation will be made of embodiments of the present invention by referring to the drawings.

First Embodiment

Figure 2:
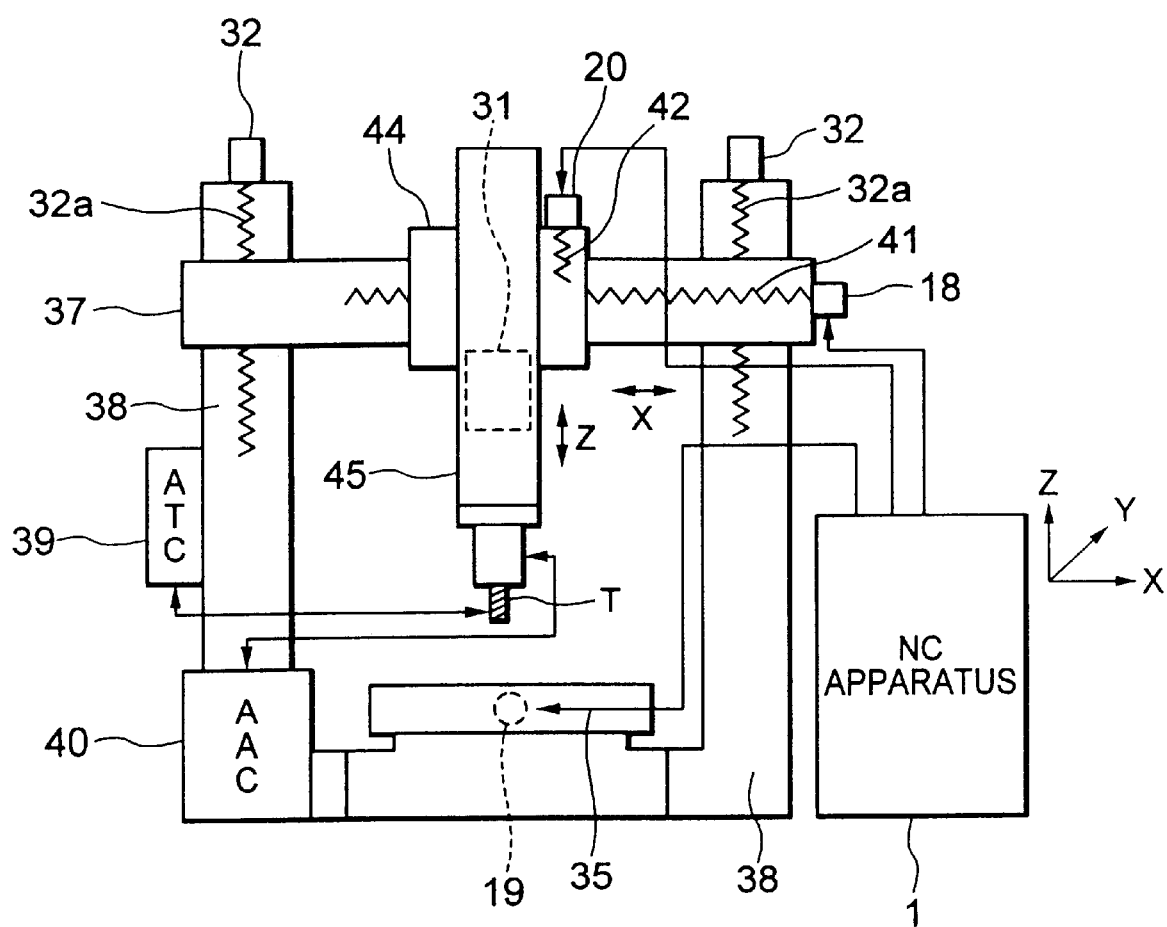
FIG. 2 is a view of the configuration of an example of a machining center as a machine tool driven by a numerical control apparatus of the present invention.

FIG. 2 is a view of the configuration of an example of a machining center as a machine tool driven by a numerical control apparatus according to the present invention.

The machining center shown in FIG. 2 is a so-called double housing type machining center and is provided with a cross rail 37 having two ends movably supported by shafts of a double housing type column 38. A ram 45 is provided movably in a vertical direction (Z-axis direction) via a saddle 44 supported movably on this cross rail 37.

The saddle 44 is provided with a not illustrated nut portion passing through the cross rail 37 in a horizontal direction. A ball screw 41 is screwed into this nut portion. An X-axis servo motor 18 is provided at an end of the ball screw 41. The ball screw 41 is driven to rotate by the X-axis servo motor 18.

By the rotation of the ball screw 41, the saddle 44 moves in the X-axis direction. By this, the ram 45 is moved in the X-axis direction.

Further, the saddle 44 is provided with a not illustrated nut portion in a vertical direction. A ball screw 42 is screwed into this nut portion. A Z-axis servo motor 20 is provided at the end of the ball screw 42. When the ball screw 42 is driven to rotate by the Z-axis servo motor 20, the ram 45 provided movable on the saddle 44 is moved in the Z-axis direction.

The ram 45 has built into it a main shaft motor 31. The main shaft motor 31 rotates an end mill or other cutting tool T provided at the front end of the ram 45.

Below the ram 45, a Y-axis table 35 is provided movably in the Y-axis direction. The Y-axis table 35 is provided with a not illustrated nut portion. A not illustrated ball screw provided along the Y-axis direction is screwed into this nut portion. A Y-axis servo motor 19 is connected to this ball screw.

The Y-axis table 35 is moved in the Y-axis direction by the rotational drive of the Y-axis servo motor 19.

The X-axis servo motor 18, Y-axis servo motor 19, and Z-axis servo motor 20 are controlled by an NC apparatus 1.

In the double housing gate type column 38 is formed with a not illustrated female thread portions. The cross rail 37 is raised and lowered by driving the rotation of the lead screw 32a screwed in it by a cross rail elevation motor 32.

Further, the cutting tool T can be changed by an automatic tool changer (ATC) 39. Various attachments may also be changed by an automatic attachment changer (AAC) 40.

Figure 3:
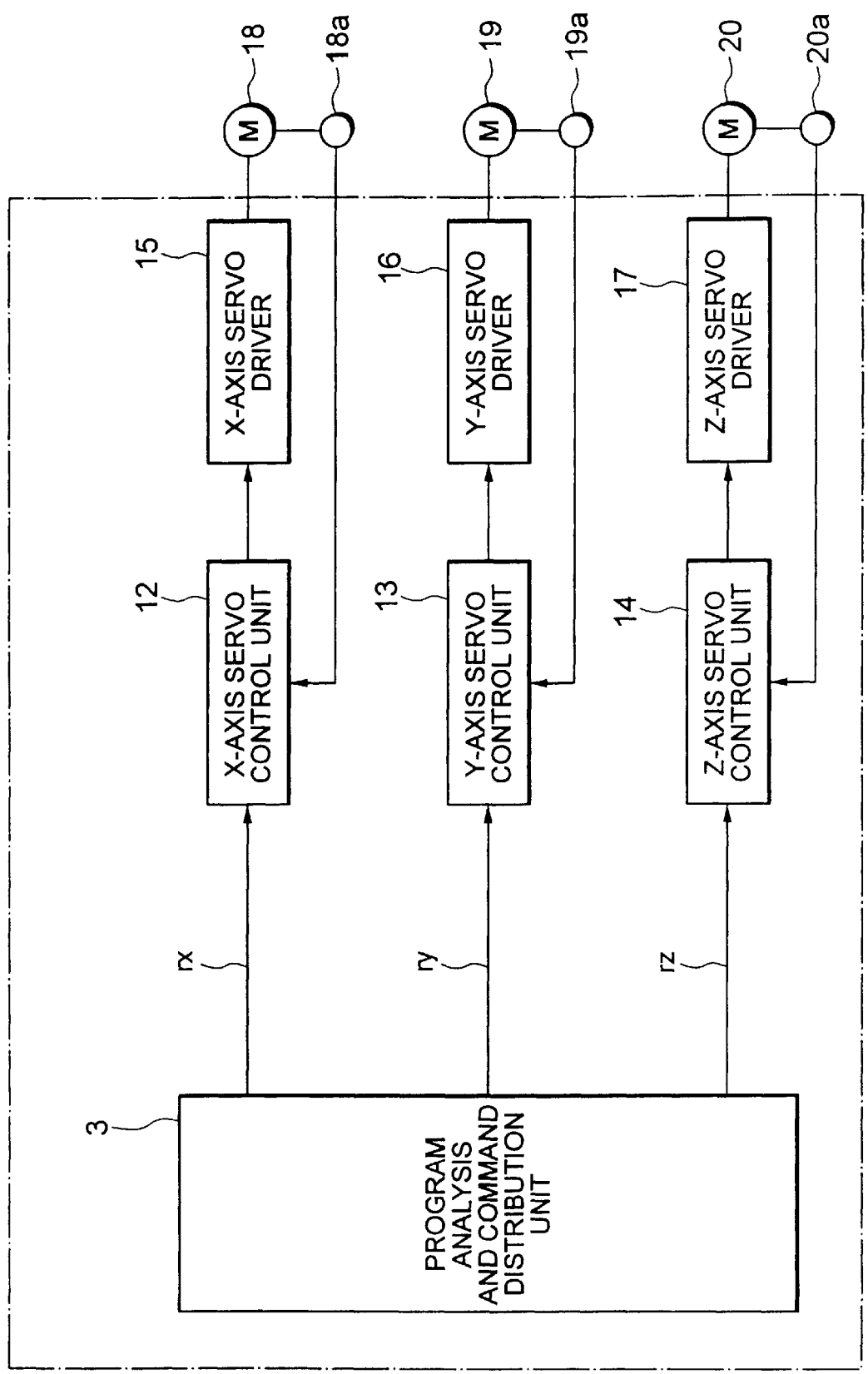
FIG. 3 is an explanatory view of the fundamental configuration of an NC apparatus according to an embodiment of the numerical control apparatus of the present invention.

FIG. 3 is an explanatory view of the fundamental configuration of an NC apparatus 1 according to an embodiment of the present invention.

In FIG. 3, the NC apparatus 1 has a program analysis and command distribution unit 3, an X-axis servo control unit 12, a Y-axis servo control unit 13, a Z-axis servo control unit 14, an X-axis servo driver 15, a Y-axis servo driver 16, and a Z-axis servo driver 17.

Further, the X-axis servo driver 15, Y-axis servo driver 16, and Z-axis servo driver 17 have connected to them an X-axis servo motor 18, Y-axis servo motor 19, and Z-axis servo motor 20. The X-axis servo motor 18, Y-axis servo motor 19, and Z-axis servo motor 20 are provided with rotational position detectors 18a, 19a, and 20a, for example, optical type rotary encoders.

The program analysis and command distribution unit 3 analyzes a machining program obtained by programming for example path data of the tool for machining an object to be machined by a predetermined language. The path data of the tool is converted to position commands (control commands) to the control axes, that is, amounts of movement, which are distributed to the control axes. Note that the specific configuration of the program analysis and command distribution unit 3 will be explained later.

The X-axis servo control unit 12, the Y-axis servo control unit 13, and the Z-axis servo control unit 14 are comprised of position loops, velocity loops, and current loops.

The position loop, for example, receives the position commands (amounts of movement) on the control axes input from the program analysis and command distribution unit 3, applies a proportional control action for multiplying the deviations between these amounts of movement and position feedback signals from the rotational position detectors 18a to 20a for detecting the rotational positions of the servo motors 18 to 20 by a position loop gain $\omega_0$, and outputs the results as velocity commands to the velocity loop.

The velocity loop, for example, applies a proportional control action and integration control action on the deviations between the speed commands and differential values (velocity feedback signals) of the position feedback signals from the rotational position sensors 18a to 20a at every sampling time to obtain torque commands and outputs these to the current loop.

The current loop, for example, applies a proportional control action to the deviations between the output torque signals of the servo motors 18 to 20 converted from the drive currents of the servo motors 18 to 20 and the torque commands to obtain current commands, converts these to a predetermined electric signals, and outputs to the servo drivers 15 to 17.

The X-, Y-, and Z-axis servo control units 12 to 14 are realized by software in the present embodiment, but can also be realized by hardware.

The X-axis servo driver 15, Y-axis servo driver 16, and Z-axis servo driver 17 output drive currents obtained by amplifying the current commands from the X-, Y-, and Z-axis servo control units 12 to 14 to the X-, Y-, and Z-axis servo motors 18 to 20.

The X-, Y-, and Z-axis servo motors 18 to 20 are driven in accordance with the drive currents. The rotational position detectors 18a to 20a provided in the X-, Y-, and Z-axis servo motors 18 to 20 output detection pulses in accordance with the rotational amounts of the X-, Y-, and Z-axis servo motors 18 to 20 to the X-, Y-, and Z-axis servo control units 12 to 14.

As the rotational position sensors 18a to 20a, for example, incremental type rotary encoders or absolute type rotary encoders may be used.

Note that the above functions are functions originally provided in a general NC apparatus. Further, the machining program used in the NC apparatus is generally automatically prepared by a CAD system, an automatic programming system, a CAM system, or the like. The prepared machining program is downloaded to the NC apparatus 1 via a predetermined storage medium or by a communicating means.

Figure 4:
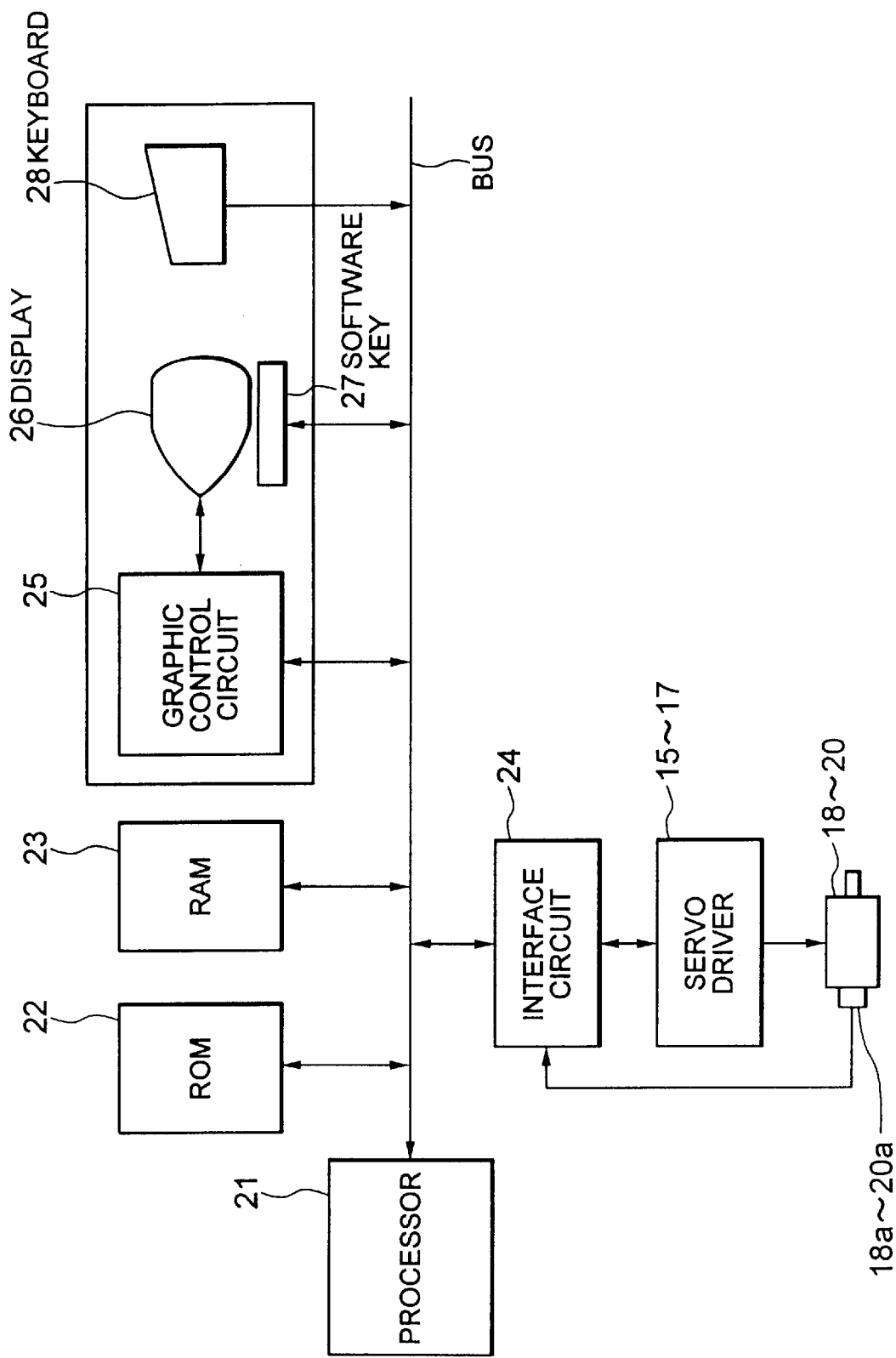
FIG. 4 is a view of an example of a hardware configuration of the numerical control apparatus shown in FIG. 3.

FIG. 4 is a view of an example of the hardware configuration of the NC apparatus 1 shown in FIG. 3.

The functions of the NC apparatus 1 shown in FIG. 3 are realized by for example hardware having the configuration shown in FIG. 4.

In FIG. 4, a microprocessor 21 is connected through a bus to a read only memory (ROM) 22, a random access memory (RAM) 23, an interface circuit 24, a graphic control circuit 25, a display device 26, a keyboard 28, software keys 27, etc.

The microprocessor 21 controls the NC apparatus 1 also whole according to a system program stored in the ROM22.

The ROM 22 stores a program for realizing the program analysis and command distribution unit 3, X-, Y-, and Z-axis servo control units 12 to 14, etc. and a system program for controlling the entire NC apparatus 1.

The RAM 23 downloads the programs stored in the ROM 22, stores various types of NC programs, data, etc.

The graphic control circuit 25 converts digital signals to display signals and gives the same to the display device 26.

As the display 26, for example, a cathode ray tube (CRT) display or a liquid crystal display (LCD) is used. The display 26 displays the shape, machining conditions, and created machining program when an operator prepares a machining program by a manual operation in a dialog format by using the software keys 27 or the keyboard 28.

The operator can prepare a machining program by inputting data according to the content (dialog type data input screen) displayed on the display 26.

The screen of the display 26 displays works or data able to be handled by that screen in a menu format. An item in the menu is selected by pressing the software keys 27 at the bottom of the menu.

The keyboard 28 is used for inputting the data required for the NC apparatus 1.

The interface circuit 24 converts a command such as a position command output from the microprocessor 21 to a predetermined signal and outputs the same to the X- to Y-axis servo drivers 15 to 17.

Further, the interface circuit 24 sequentially counts for example the detection pulses from the position detectors 18a to 20a provided in the X- to Z-axis servo motors 18 to 20, converts the same to predetermined digital signals, and outputs them to the microprocessor 21.

Figure 5:
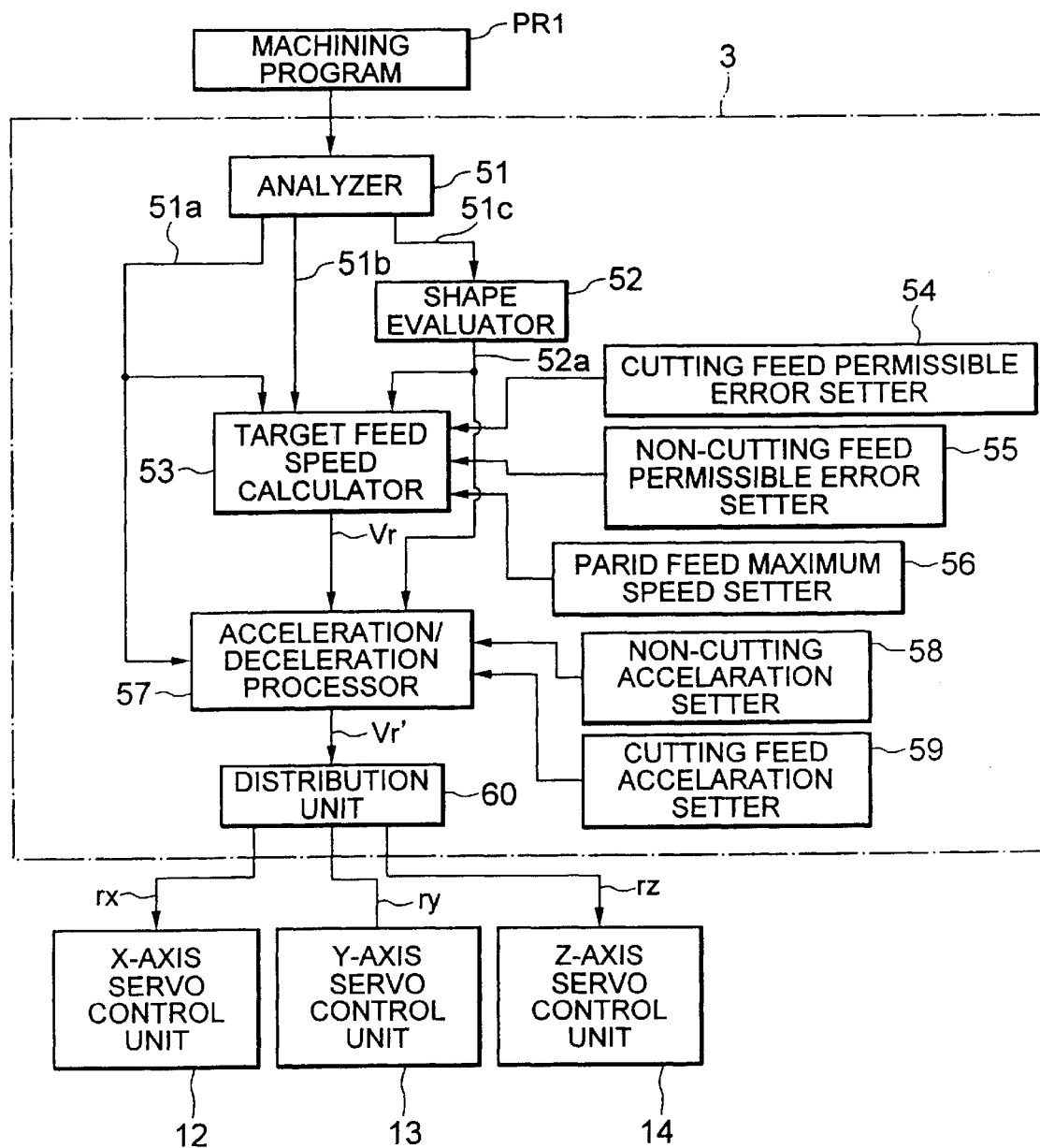
FIG. 5 is a view of the configuration of a numerical control apparatus according to an embodiment of the present invention.

FIG. 5 is a view of the configuration of a numerical control apparatus according to an embodiment of the present invention and shows the configuration of the program analysis and command distribution unit 3.

The program analysis and command distribution unit 3 has an analyzer 51, a shape evaluator 52, a target feed speed calculator 53, a cutting feed permissible error setter 54, a non-cutting feed permissible error setter 55, a rapid feed maximum speed setter 56, an acceleration/deceleration processor 57, a non-cutting acceleration setter 58, a cutting feed acceleration setter 59, and a distribution unit 60.

Here, the target feed speed calculator 53, cutting feed permissible error setter 54, non-cutting feed permissible error setter 55, acceleration/deceleration control unit 57, non-cutting acceleration setter 58, cutting feed acceleration setter 59 and distribution unit 60 correspond to a concrete example of the target feed speed calculating means, cutting feed permissible error setting means, non-cutting feed permissible error setting means, acceleration/deceleration processing means, non-cutting acceleration setting means, cutting feed acceleration setting means, and distributing means of the present invention.

Further, the analyzer 51 and the shape evaluator 52 configure the analyzing means of the present invention, while the target feed speed calculator 53 and the acceleration/deceleration processor 57 configure the feed speed optimizing means of the present invention.

The analyzer 51 analyzes the machining program PR1 prepared in advance to be downloaded to the analyzer 51 to extract the information for specifying the final feed speed of the cutting tool T to the workpiece from the cutting feed command program contained in the machining program PR1.

Specifically, it sequentially outputs movement information 51c and feed speed information 51b per unit time in the control axis directions defined in the machining program PR1.

Further, the analyzer 51 extracts machining information 51a added to the cutting feed command program contained in the machining program PR1.

This machining information 51a is specifically cutting/non-cutting information for defining actual cutting by the cutting tool T. Namely, it is information indicating if the cutting tool T is to actually perform cutting by the feed speed and the amount of movement defined by the cutting feed command.

Figures 6, 7:
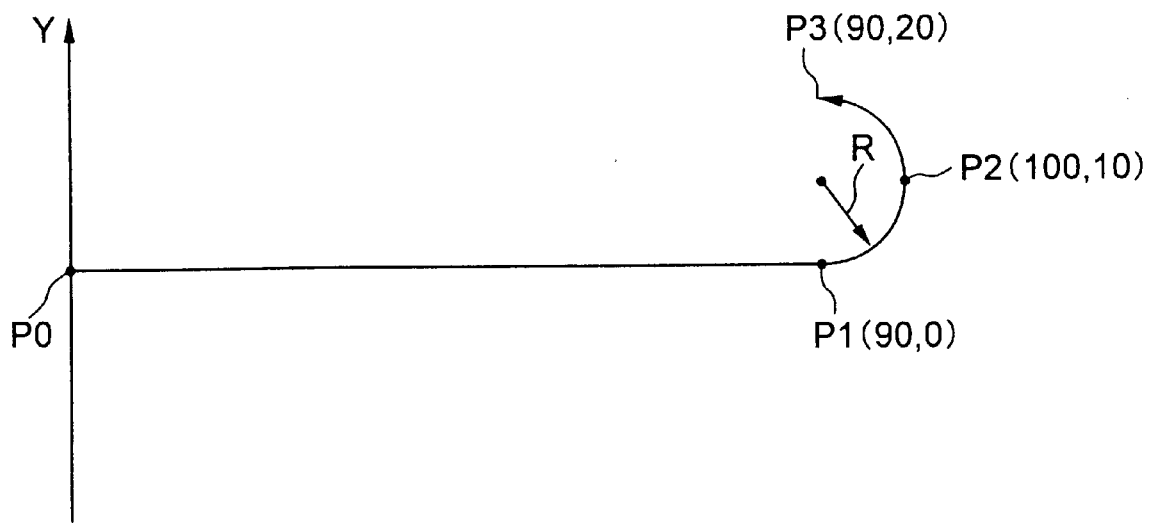
FIG. 6 is a view of an example of a machining program PR1 downloaded to an analyzer.
FIG. 7 is a view of a path of movement of a cutting tool defined by the machining program PR1.
Figure 8:
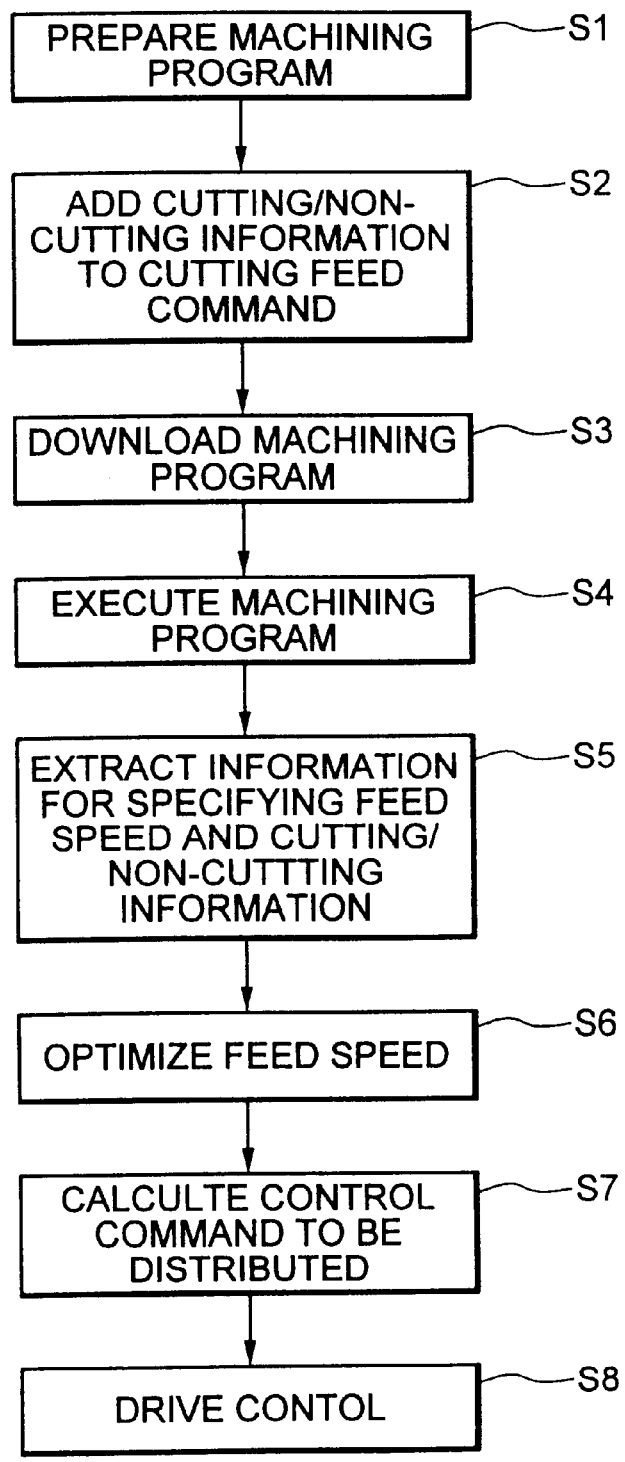
FIG. 8 is a flowchart for explaining a control method of a machining center using an NC apparatus according to a first embodiment of the present invention.

Here, FIG. 6 is a view of an example of the machining program PR1 downloaded to the analyzer 51. Further, FIG. 7 is a view of the path of movement of the cutting tool T defined by the machining program PR1.

In FIG. 6, G00 of a program (1) of a sequence N00 is a rapid feed command. The program (1) is a code for fast feeding the cutting tool T to the origin on the program in the X-axis direction.

G01 of a program (2) of a sequence N01 is a cutting feed command of linear movement. F is a character defining the cutting feed speed at the time of cutting feed.

Further, Q is modal data for defining the cutting/non-cutting information 51b. For example, when Q is 0, it defines the case of actual cutting, while when Q is 1, it defines the case of not cutting.

Accordingly, the program (2) is a command for cutting feeding of the cutting tool T up to a position 90 mm from the origin in the X-axis direction at a feed speed of 10,000 mm/sec.

The path of movement of the cutting tool T defined by the program (2) is linear from the origin position P0 (0, 0) to a position P1 (90, 0) as shown in FIG. 7.

G02 in a program (3) of a sequence N02 is a cutting feed command, but it is a command not for linear movement, but arc cutting feed, that is, a code for moving the cutting tool T on a designated arc having a radius R to designated X-, Y-coordinates. Note that the cutting feed speed is a value designated by the program (2).

Accordingly, the path of movement of the cutting tool T defined by the program (3) is an arc connecting the position P1 (90, 0) and a position P2 (100, 10) as shown in FIG. 7.

The program (3) is a command for cutting feeding of a cutting tool T over an arc having a radius of curvature of 10 mm connecting the position P1 and the position P2 at a feed speed of 10,000 mm/sec, but the value of Q is 1, so the cutting tool T does not actually cut.

A program (4) of a sequence N03 is a command for moving the cutting tool T along an arc having a radius of curvature of 10 mm connecting the position P2 (100, 10) and a position P3 (90, 20) shown in FIG. 7 at a feed speed of 10,000 mm/sec.

In the program (4), the value of Q is 0, so the cutting tool T actually cuts.

The analyzer 51 sequentially outputs movement information 51c per unit time in the X-axis and Y-axis directions by analyzing the machining program PR1, outputs the value of the cutting feed speed F of the machining program PR1 as the feed speed information 51b, and outputs the cutting/non-cutting information 51a designated by the modal data Q of the machining program PR1.

The shape evaluator 52 calculates the path of movement over which the cutting tool T moves from the movement information 51c per unit time in the X-axis and Y-axis directions output from the analyzer 51 and outputs this as path of movement information 52a to the target feed speed calculator 53. The information such as the radius of curvature of the cutting tool T is obtained from this path of movement information 52a.

The cutting feed maximum speed setter 54 holds a permissible error dR1 for defining a permissible range of the error from the path of movement of the cutting tool T at the time of cutting feed. Namely, it holds the permissible error dR1 for defining the permissible range of the position deviation (position error) of the cutting tool T from the path of movement when moving the cutting tool T by a cutting feed command such as the cutting feed command G01 or G02 of the program (2) or (4) and actually cutting (when the modal data Q is 0).

The non-cutting feed permissible error setter 55 holds a permissible error dR2 for defining the permissible range of error of the cutting tool T from the path of movement at the time of non-cutting feed. Namely, it holds the permissible error dR2 in a case where moving the cutting tool T by a cutting feed command like G02 of the program (3) and actually cutting by the cutting tool T (when the modal Q is 1).

The rapid feed maximum speed setter 56 holds a maximum feed speed Fmax of the cutting tool T in the case where moving the cutting tool T by a cutting feed command like G02 of program (3) and not actually cutting by the cutting tool T (when the modal Q is 1).

The target feed speed calculator 53 receives as input the cutting/non-cutting information 51a, feed speed information 51b, and path of movement information 52a from the analyzer 51 and optimizes the target feed speed Vr of the cutting tool T based on the information.

Specifically, the target feed speed calculator 53 calculates a permissible feed speed V of the cutting tool T by for example the following equation (1) in order to get the precision of the machined surface by the cutting tool T to be within a constant range. Note that, $\omega_0$ in equation (1) is the position loop gain $\omega_0$ of the servo control units 12 to 14, R is the radius of curvature of the path of movement of the cutting tool T calculated at the shape evaluator 52, and dR is the permissible error defining the permissible range of position deviation of the cutting tool T from the path of movement:

$$V = \omega_0 \times (2 \times R \times dR)^{1/2} \quad (1)$$

The target feed speed calculator 53 selects one of the permissible error dR1 and dR2 set in the cutting feed maximum speed setter 54 and the non-cutting feed permissible error setter 55 in accordance with the input cutting/non-cutting information 51a, that is, the value of the modal data Q, and uses the same as the permissible error dR.

Further, the target feed speed calculator 53 specifies the radius of curvature R of the path of movement of the cutting tool T from the path of movement information 52a of the shape evaluator 52. The position loop gain $\omega_0$ is set in advance in the NC apparatus 1.

The target feed speed calculator 53 compares the permissible feed speed V calculated by using the permissible error dR1 and the value of the feed speed F designated by the program (2) obtained from the analyzer 51 in the case where for example of actual cutting by the cutting tool T (when the value of the modal data Q is 0). When the value of the feed speed F exceeds the permissible feed speed V, the target feed speed Vr of the cutting tool T is restricted within the permissible feed speed V. From the viewpoint of shortening the machining time, the target feed speed Vr is made equal to the permissible feed speed V. The determined target feed speed Vr is output to the acceleration/deceleration processor 57.

On the other hand, the target feed speed calculator 53 optimizes the target feed speed Vr of the cutting tool T so as to be within the permissible feed speed V calculated by using the permissible error dR2 in the case where for example not actually cutting by the cutting tool T (when the value of the modal data Q is 1). From the viewpoint of shortening the machining time, the target feed speed Vr is made equal to the permissible feed speed V.

In this case, when the target feed speed Vr of the cutting tool T exceeds the value of the feed speed F designated by the program (2) obtained from the analyzer 51, the target feed speed Vr of the cutting tool T is set within a range not exceeding the maximum feed speed Fmax of the cutting tool T set in the rapid feed maximum speed setter 56.

The optimized target feed speed Vr is output to the acceleration/deceleration processor 57.

For example, the program (3) of the machining program PR1 defines the movement of the cutting tool T by an arc cutting feed command, but the cutting tool does not actually cut, so the cutting feed speed of the cutting tool T at this time does not effect the machining precision of the work. For this reason, the value of the permissible error dR2 set in the non-cutting feed permissible error setter 55 can be changed to a value larger than the permissible error dR1 set in the cutting feed maximum speed setter 54.

As a result, the permissible feed speed V calculated by using the permissible error dR2 becomes a value larger than the permissible feed speed V calculated by using the permissible error dR1. Even if a cutting feed command is used when not actually cutting, high speed movement becomes possible.

In other words, by setting the permissible error dR2 large when preparing the machining program PR1, the target feed speed Vr of the cutting tool T can be controlled at the machining program PR1 side.

The cutting feed acceleration setter 59 holds a permissible acceleration A1 to the cutting tool T in the case of actual cutting (when the value of the modal data Q is 0) at the time of a feed operation by the cutting feed command of the cutting tool T in order to prevent the torques of the servo motors 18, 19, and 20 from becoming saturated and the permissible acceleration permitted by the machining center from being exceeded.

The non-cutting acceleration setter 58 holds a permissible acceleration A2 to the cutting tool T in the case of not actually cutting (when the value of the modal data Q is 1) at the time of a feed operation by the cutting feed command of the cutting tool T from the viewpoint of avoiding the torque saturation and the permissible acceleration from being exceeded. The permissible acceleration A2 is the maximum acceleration at the time of rapid feeding at the time of non-cutting, so a large value can be set in comparison with the permissible acceleration A1.

The acceleration/deceleration processor 57 is input the cutting/non-cutting information 51*a* and the path of movement information 52*a*, calculates a permissible feed speed Va for restricting the acceleration applied to the drive mechanism to the permissible acceleration set in advance in order to prevent the torques of the servo motors 18, 10 and 20 from being saturated and exceeding the permissible acceleration permitted by the machining center, and further optimizes the target feed speed Vr input from the target feed speed calculator 53.

The acceleration/deceleration processor 57 specifically calculates the permissible feed speed Va by the following equation (2). Note that, in (2), A is the permissible acceleration and R is the radius of curvature the same as that in equation (1).

$$Va = (A \times R)^{1/2} \qquad (2)$$

The acceleration/deceleration processor 57 selects one of the permissible accelerations A1 and A2 set in the cutting feed acceleration setter 59 and the non-cutting acceleration setter 58 in accordance with the input cutting/non-cutting information 51*a*, that is, the value of the modal data Q, and uses the same as the permissible acceleration A.

The acceleration/deceleration processor 57 compares the calculated permissible speed Va and the target feed speed Vr input from the target feed speed calculator 53. When the target feed speed Vr exceeds the permissible speed Va, the target feed speed Vr is optimized to be within the permissible speed Va. From the viewpoint of high speed machining, preferably the target feed speed Vr is made the same as the permissible speed Va.

The acceleration/deceleration processor 57 newly outputs a newly optimized target feed speed Vr' to the distribution unit 60.

The permissible speed Va calculated in accordance with the value of the modal data Q in the acceleration/deceleration processor 57 has a larger value when the value of the modal data Q is 1, that is, at the time of non-cutting, since the permissible acceleration A2 has a larger value than the calculated permissible acceleration A1.

As a result, in the acceleration/deceleration processor 57, even if a cutting feed command is used in the case of not actually cutting, the feed speed of the cutting tool T is not unnecessarily restricted, high speed movement of the cutting tool T becomes possible, and the machining time can be shortened.

Further, in the paths of movement comprised by the arcs defined by the programs (3) and (4) of the machining program PR1, the designated feed speeds F and the lengths of the arcs are the same, but the time required for the movement of the cutting tool T becomes shorter in the case of the program (3) when the value of the modal data Q is set at 1.

The distribution unit 60 calculates position commands rx, ry, and rz with respect to the control axes, that is, the amounts by which the control axes should move, based on the optimized feed speeds Vr' sequentially output from the acceleration/deceleration processor 57 and outputs the same to the servo control units 12, 13, and 14.

Next, an explanation will be made of a control method of a machining center using the NC apparatus 1 having the above configuration by referring to the flowchart shown in FIG. 6.

First, the machining program PR1 as described above defining machining process of a workpiece by the machining center is prepared (step S1).

This machining program PR1 can be automatically prepared by for example a CAD system, automatic programming system, or a CAM system.

The modal data Q indicating the cutting/non-cutting information defining actual cutting by the cutting tool is added to the cutting feed command program contained in the prepared machining program (step S2).

Specifically, for example, in the cutting of a free curved surface of a die or the like, cutting/non-cutting information is added to a program for fast feed without actual cutting, that is, for pick feed of the cutting tool T, using an arc cutting feed command as indicated by G02 described above.

Next, the machining program with the cutting/non-cutting information added thereto is downloaded to the NC apparatus 1 (step S3). Next, this machining program is executed (step S4).

Then, the analyzer 51 and the shape evaluator 52 of the NC apparatus 1 extract from the cutting feed command program contained in the machining program to be executed the information for specifying the feed speed of the cutting tool T to the workpiece, that is, the feed speed F, the path of movement information 51*c*, and the cutting/non-cutting information 51*a* (step S5).

Next, based on the extracted feed speed F, path of movement information 51*c*, and cutting/non-cutting information 51*a*, the target feed speed calculator 63 calculates the permissible feed speed V of the cutting tool T in accordance with the value of the modal data Q and optimizes the target feed speed Vr of the cutting tool T to be within the permissible feed speed V (step S6). Preferably, the target feed speed Vr is made the permissible feed speed V.

By this, when the value of the modal data Q is 0 (at the time of cutting), the target feed speed Vr is optimized so that the machining precision of the workpiece becomes within a constant range. When the value of the modal data Q is 1 (at the time of non-cutting), the target feed speed Vr is made as high as possible.

Next, the target feed speed Vr optimized so that the machining precision of the workpiece becomes within the constant range and so that the speed does not become unnecessarily lowered is further optimized from the viewpoint of the prevention of saturation of the torques of the motors and easing the shock to the machining center.

In this case, even in a case when using a cutting feed command for the feed command of the cutting tool T irrespective of the fact of no actual cutting, the target feed speed Vr is optimized so that the speed is not unnecessarily lowered. This optimized target feed speed Vr' is output to the distribution unit 60.

Next, the distribution unit 60 calculates the position commands rx, ry, and rz with respect to the control axes, that is, the amounts by which the control axes should move, based on the feed speed Vr' (step S7). Then, it outputs these amounts of movement to the servo control units 12, 13, and 14 and controls the control axes (step S8).

As a result, the workpiece is cut by the cutting tool T.

As described above, according to the present embodiment, for example, at the time of non-cutting feed, when using a cutting feed command for feed where the path of movement of the cutting tool T is a curve such as an arc, it is possible to prevent that the feed speed of the cutting tool T from being unnecessarily restricted and as a result the machining time from becoming long.

In the case of a configuration where the cutting/non-cutting information cannot be recognized at the NC apparatus side, the feed speed is restricted in the target speed calculator 53 and the acceleration/deceleration processor 64, therefore, as a result, the machining time becomes long, but this can be prevented in the present embodiment.

Further, according to the present embodiment, by newly adding machining information indicating cutting/non-cutting to the cutting feed command program contained in the machining program, the feed speed of the cutting tool T can be optimized at the machining program side.

Second Embodiment

Figure 9:
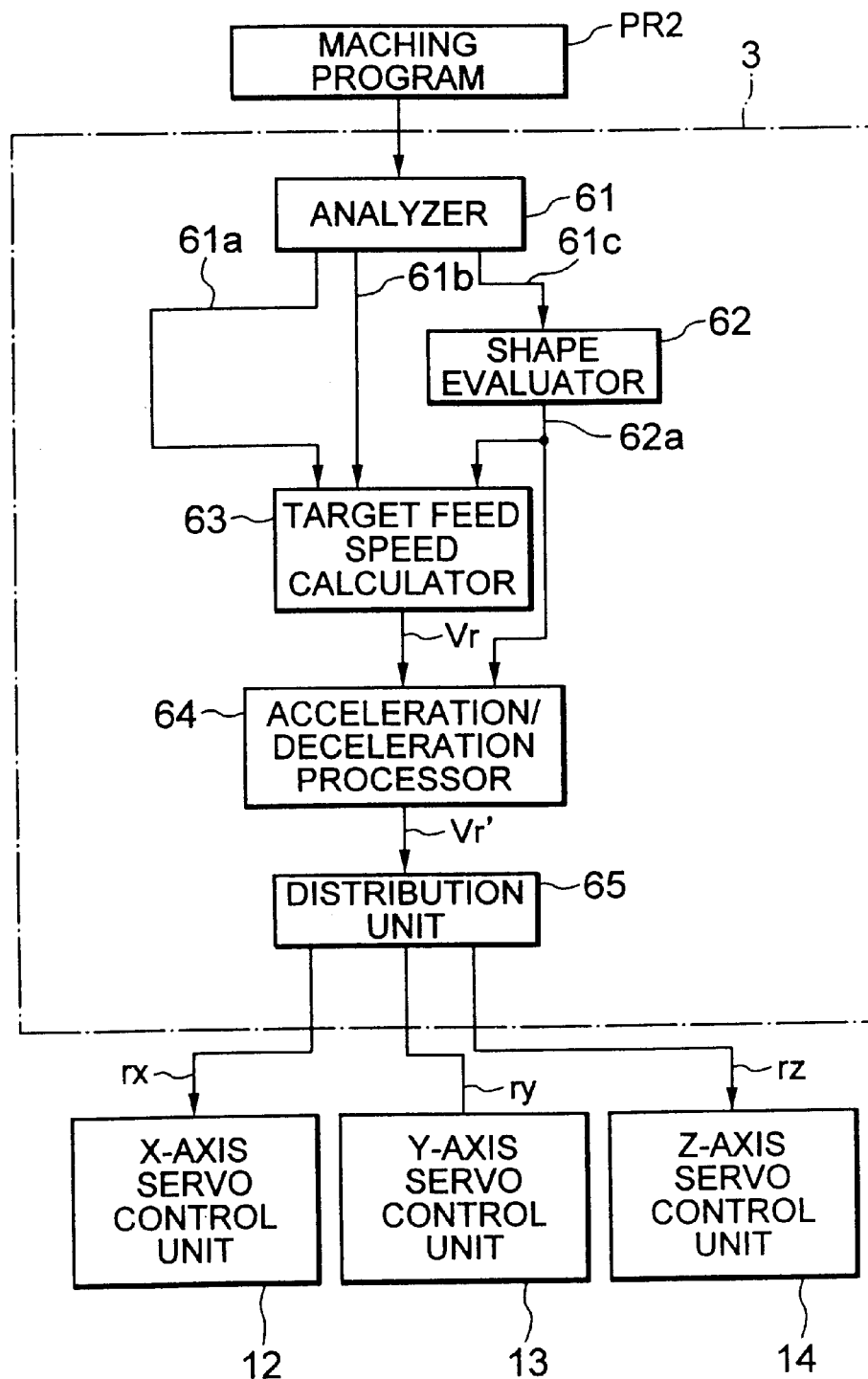
FIG. 9 is a view of the configuration of a numerical control apparatus according to a second embodiment of the present invention.

FIG. 9 is a view of the configuration of an NC apparatus according to a second embodiment of a numerical control apparatus of the present invention and shows another configuration of the program analysis and command distribution unit 3 of the NC apparatus 1.

The program analysis and command distribution unit 3 according to the present embodiment has an analyzer 61, a shape evaluator 62, a target feed speed calculator 63, an acceleration/deceleration processor 64, and a distribution unit 65.

Here, the target feed speed calculator 63 and the acceleration/deceleration processor 64 configure the feed speed optimizing means in a numerical control apparatus of a machine tool according to the third aspect of the present invention, while the distribution unit 65 configures the distributing means.

The analyzer 61 analyzes the machining program PR2 prepared in advance similar to the analyzer 51 according to the first embodiment and sequentially outputs the movement information 51c and the feed speed information 51b per unit time in the control axis directions defined in the machining program PR1.

Further, the analyzer 61 extracts the machining information 61a added to the cutting feed command program contained in the machining program PR1 similar to the analyzer 51. The machining information 61a in the present embodiment is the permissible error dR defining the permissible range of the error of the cutting tool T from the path of movement explained in the first embodiment.

Here, FIG. 10 is a view of an example of the machining program PR2 downloaded to the analyzer 61.

The path of movement and the feed speed F of the cutting tool T defined by the machining program PR2 shown in FIG. 10 are exactly the same as those of the machining program PR1 explained in FIG. 6.

The point of difference resides in that, not the cutting/non-cutting information, but modal data E for designating the value of the permissible error dR is added to the programs (3) and (4) of the machining program PR2.

The permissible error dR is designated as 0.002 mm in the program (3), while the permissible error dR is designated as 0.05 mm in the program (4).

Accordingly, the program (3) is a command for arc feeding and cutting the portion from the position P1 to the position P2 shown in FIG. 7 with a machining precision of 0.002 mm, while the program (4) is a command for arc feeding and cutting the portion from the position P2 to the position P3 with a machining precision of 0.05 mm.

The shape evaluator 62 calculates the path of movement of the cutting tool T from the movement information 61c per unit time in the X-axis and Y-axis directions output from the analyzer 61 similar to the shape evaluator 52 according to the first embodiment and outputs this as the path of movement information 62a to the target feed speed calculator 63. Information such as the radius of curvature of the path of movement of the cutting tool T is obtained from this path of movement information 62a.

The target feed speed calculator 63 receives as input the information 61a of the permissible error dR, a feed speed information 61b, and a path of movement information 62a from the analyzer 61 similar to the target feed speed calculator 53 according to the first embodiment and optimizes the target feed speed Vr of the cutting tool T based on this information.

Specifically, the target feed speed calculator 63 calculates the permissible feed speed V of the cutting tool T by equation (1) in order to realize of precision of the machined surface by the cutting tool T within the constant range.

The target feed speed calculator 63 calculates the permissible feed speed V by using the value of the permissible error dR designated by the modal data E when executing equation (1).

Accordingly, the permissible feed speed V calculated at the target feed speed calculator 63 becomes a value in accordance with the value of the permissible error dR designated by the modal data E, becomes high when the permissible error dR is large (the machining precision is low), and becomes a low value when the permissible error dR is small (the machining precision is high).

The target feed speed calculator 63 restricts the target feed speed Vr to the permissible feed speed V, but makes the permissible feed speed V the target feed speed Vr from the viewpoint of shortening the machining time.

By this, when a high machining precision is not required and the permissible error dR is large, the target feed speed Vr is set at a relatively high value, while when a high machining precision is required and the permissible error dR is small, the target feed speed Vr is set at a relatively low value, and the target feed speed Vr is optimized.

The acceleration/deceleration processor 64 calculates the permissible feed speed Va by equation (2) based on the radius of curvature R of the path of movement of the cutting tool T and the permissible acceleration A set in advance permitted to the cutting tool T.

The acceleration/deceleration processor 64 further optimizes the target feed speed Vr input from the target feed speed calculator 63 so as to be within the calculated permissible feed speed Va. Preferably, from the viewpoint of shortening the machining time, the permissible feed speed Va is optimized to the target feed speed Vr and output as the target feed speed Vr' to the distribution unit 65.

The distribution unit 65 acts exactly the same as the distribution unit 60 according to the first embodiment, calculates the position commands rx, ry, and rz with respect to the control axes based on the feed speed Vr', and outputs them to the servo control units 12, 13, and 14.

Figure 11:
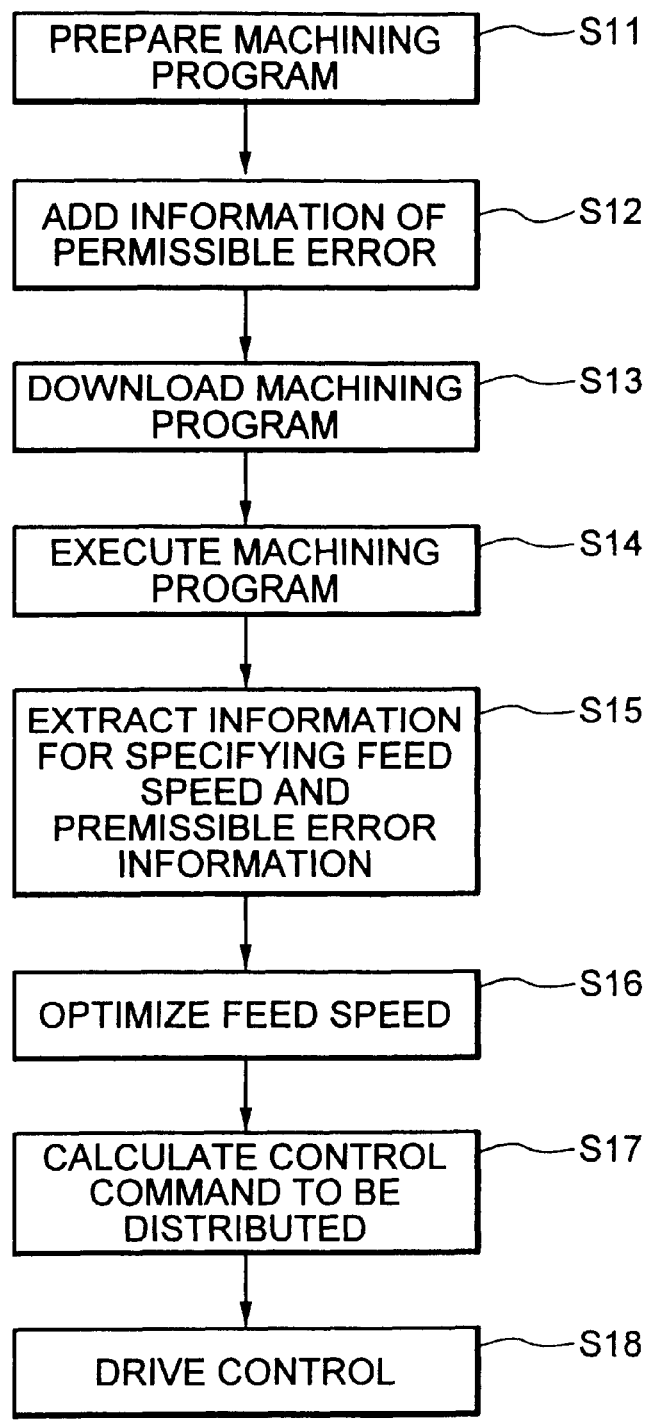
FIG. 11 is a flowchart for explaining a control method of a machining center using an NC apparatus according to a second embodiment of the present invention

Next, an explanation will be made of the control method of a machining center using an NC apparatus according to the present embodiment by referring to the flowchart shown in FIG. 11.

First, a machining program for defining the routine of machining a workpiece by the machining center is prepared (step S11).

Next, the information of the permissible error dR defining the permissible range of error from the path of movement of the cutting tool is appropriately added to the cutting feed command program contained in the prepared machining program by using the modal data E (step S12).

The information of this permissible error dR is naturally added to a cutting feed command program where the path of movement of the cutting tool T becomes a curve such as an arc.

Next, the machining program with the information of the permissible error dR added thereto is downloaded to the NC apparatus (step S13). Then, this machining program is executed (step S14).

Next, the analyzer 61 and the shape evaluator 62 of the NC apparatus 1 extract the information 61b and 62a for specifying the feed speed of the cutting tool T to the workpiece and the information of the permissible error dR from the downloaded cutting feed command program (step S15).

Next, the target feed speed calculator 63 calculates the permissible feed speed V of the cutting tool T in accordance with the value of the permissible error dR designated by the modal data E based on the extracted information and optimizes the target feed speed Vr of the cutting tool T so as to be within the calculated permissible feed speed V (step S16). Preferably, the target feed speed Vr is optimized to the permissible feed speed V.

Due to this, the target feed speed Vr is optimized to a value in accordance with the permissible error dR designated by the machining program, that is, a value in accordance with the required machining precision.

As shown in equation (2), the permissible feed speed V is calculated based on the position loop gain $\omega_0$, radius of curvature R of the path of movement, and the permissible error dR.

For example, when the position loop gain $\omega_0$ is 50 rad/sec and the permissible errors dR designated by the modal data E are 0.002 mm and 0.05 mm, the permissible feed speed V becomes 10 mm/sec and 50 mm/sec.

Accordingly, if the required machining precision is high, the permissible feed speed V becomes low in accordance with that, while if the required machining precision is low, it becomes high in accordance with that.

Further, when the position loop gain $\omega_0$ is 40 rad/sec, that is, when the machine performance is low in comparison with the above description, the permissible feed speed V becomes 8 mm/sec where the permissible error dR is 0.002 mm and becomes 40 mm/sec where it is 0.05 mm.

From this, the permissible feed speed V is adjusted in accordance with the machine performance. As a result, the target feed speed Vr is optimized.

Then, the acceleration/deceleration processor 64 further optimizes the target feed speed Vr calculated at the target feed speed calculator 63 so that the acceleration of the cutting tool T does not exceed the saturation of the torques of the servo motors and the permissible speed of the machining center and thereby obtain the target feed speed Vr'.

The position commands rx, ry, and rz to be distributed to the control axes of the machining center are calculated based on the optimized target feed speed Vr' (step S17). Then, the control axes are controlled (step S18). By this, the workpiece is machined.

As described above, according to the present embodiment, when the permissible error dR is added to the machining program as the machining information, the information of this permissible error dR is extracted at the NC apparatus 1 side and the cutting feed speed F of the cutting tool T is optimized, and a relatively high machining precision is required, the cutting feed speed of the cutting tool T becomes slow in accordance with that, while when only a relatively low machining precision is required, the cutting feed speed of the cutting tool T becomes rapid in accordance with that.

For this reason, in comparison with the case where the cutting feed speed is made uniform irrespective of the permissible error dR, the machining time can be greatly shortened and, at the same time, the machining precision of the workpiece can be maintained.

Further, according to the present embodiment, even if the machining precision is defined by the machining program and even if the machining program is used in machine tools such as machining centers having different performances, the cutting feed speed is optimized in accordance with the performance of the machine tool. For this reason, it becomes unnecessary to remodify the machining program obtained by automatically preparing the machining program by using for example the CAM system again.

Note that, the present invention is not limited to the above embodiments. For example, the first embodiment was configured to optimize the feed speed of the cutting tool T at the target feed speed calculator 63 in accordance with the cutting/non-cutting information and to further optimize it at the acceleration/deceleration processor 64, but it is also possible to configure the feed speed at one or both of the target feed speed calculator 63 and the acceleration/deceleration processor 64 in accordance with the cutting/non-cutting information.

Further, in the embodiments, the explanation was made of the case of the cutting/non-cutting information or the permissible error as the machining information, but it is also possible to employ a configuration adding other machining information to the cutting feed command and it is also possible to add both of the cutting/non-cutting information and the permissible error as the machining information to the cutting feed command.

According to the present invention, the machining time can be shortened while maintaining the machining precision of the work.

Further, according to the present invention, even if a workpiece is machined by machine tools having different performances by using the same machining program, the machining precision of the workpiece can be maintained.

While the invention has been described by reference to specific embodiments chosen for purposes of illustration, it should be apparent that numerous modifications could be made thereto by those skilled in the art without departing from the basic concept and scope of the invention.

What is claimed is:

1. A numerical control apparatus of a machine tool comprising:

an analyzing means for analyzing a machining program defining a machining process of a workpiece by the machine tool to extract therefrom, a cutting feed command program included in said machining program, and cutting/non-cutting information defining actual cutting by said cutting tool added to said cutting feed command program, a non-cutting feed permissible error setting means for setting a permissible error defining a permissible range of error from a path of movement of said cutting tool at the time of non-cutting feed, a cutting feed permissible error setting means for setting a permissible error at the time of cutting feed, a target feed speed calculating means for selecting one of the permissible errors set by the non-cutting feed permissible error setting means and cutting feed permissible error setting means in accordance with the content of said cutting/non-cutting information, calculating a permissible feed speed of said cutting tool based on the selected permissible error, and restricting the feed speed of the cutting tool to the permissible feed speed, and a distributing means for calculating control commands to be distributed to the control axes of the machine tool based on the feed speed.

2. A numerical control apparatus of a machine tool as set forth in claim 1, further comprising, a non-cutting feed acceleration setting means for setting a permissible acceleration at the time of non-cutting feed of the cutting tool, a cutting feed acceleration setting means for setting a permissible acceleration at the time of cutting feed of the cutting tool, and an acceleration/deceleration processing means for selecting one of the permissible accelerations set by the non-cutting feed acceleration setting means and cutting feed acceleration setting means in accordance with the content of said cutting/non-cutting information and calculating the permissible feed speed of said cuffing tool restricting the acceleration of the cutting tool to the permissible acceleration to optimize the feed speed.

3. A numerical control apparatus of a machine tool as set forth in claim 1, wherein said cutting feed command program defines the path of movement of the machining point of the cutting tool by a curve.

4. A numerical control apparatus of a machine tool as set forth in claim 1, wherein said target feed speed calculating means calculates the permissible feed speed form the permissible error, a position loop gain of a servo controlling means controlling the control axes based on said distributed control commands, and a radius of curvature of the path of movement of a machining point of said cutting tool.

5. A numerical control apparatus of a machine tool as set for the in claim 4, wherein said acceleration/deceleration processing means calculates said permissible feed speed form said radius of curvature of the path of movement of the machining point of said cutting tool and the permissible acceleration.

6. A control method for a machine tool comprising:

preparing a machining program defining machining process of a workpiece by the machine tool provided with a cutting tool able to move in the directions of a plurality of control axes by a driving means, adding cutting/non-cutting information defining actual cutting by said cutting tool to a cutting feed command program included in said machining program, downloading the machining program added with the cutting/non-cutting information to a numerical control apparatus and executing said machining program, extracting the cutting/non-cutting information from said cutting feed command program at said numerical control apparatus, selecting one of the preset permissible errors at the time of non-cutting feed and at the time of cutting feed in accordance with the extracted cutting/non-cutting information, calculating a permissible feed speed based on the selected permissible error, and optimizing the feed speed of the cutting tool to be within said permissible feed speed, and calculating control commands to be distributed to the control axes of the machine tool based on the optimized feed speed and controlling the control axes.

7. A control method for a machine tool as set forth in claim 6, further comprises a step of selecting one of the preset permissible acceleration at the time of non-cutting feed of the cutting tool and permissible acceleration at the time of cuffing feed in accordance with the cutting/non-cuffing information and calculating the permissible feed speed of the cuffing tool restricting the acceleration of the cutting tool to the permissible acceleration.

* * * * *